United States Patent [19]
Dublinski et al.

[11] Patent Number: 5,217,669
[45] Date of Patent: Jun. 8, 1993

[54] METHOD FOR FORMING COMPLEX COMPOSITE ARTICLES

[75] Inventors: Alex C. Dublinski, Northford, Conn.; David A. Evans, Chelmsford, Mass.; Joseph Goldberg, Easton, Conn.; Geoffrey C. R. Davis, Madison, Conn.; William Sharp, Jr., Haddam, Conn.; Michael A. Kornitzky, Branford, Conn.

[73] Assignee: United Technologies Corporation, Hartford, Conn.

[21] Appl. No.: 757,725

[22] Filed: Sep. 11, 1991

Related U.S. Application Data

[60] Division of Ser. No. 576,176, Aug. 30, 1990, Pat. No. 5,071,338, which is a continuation of Ser. No. 128,134, Dec. 3, 1987, abandoned, which is a continuation-in-part of Ser. No. 93,937, Sep. 8, 1987, abandoned.

[51] Int. Cl.$^5$ .............................................. B29C 33/12
[52] U.S. Cl. .................................... 264/258; 264/275; 264/277; 264/313
[58] Field of Search ............. 249/94, 96, 134, 212; 425/123, 383, 388, 470, DIG. 60, 504, 500, 403, 389; 428/137, 138, 172; 156/285, 382; 264/257, 258, 313, 314, 317, 219, 220, 225, 226, 227, 259, 275, 277

[56] References Cited

U.S. PATENT DOCUMENTS

| | | | |
|---|---|---|---|
| 3,295,818 | 1/1967 | Kreier | 249/134 |
| 4,025,686 | 5/1977 | Zion | 264/46.5 |
| 4,721,593 | 1/1988 | Kowal | 264/258 |
| 4,882,118 | 11/1989 | Megarry | 264/258 |

Primary Examiner—Jay H. Woo
Assistant Examiner—James P. Mackey
Attorney, Agent, or Firm—McAulay Fisher Nissen Goldberg & Kiel

[57] ABSTRACT

A method of making a flexible composite tool particularly adapted for composite molding and the composite tool made by this method. The method includes dissolving a B-staged fluoroelastomer in a suitable solvent such as methyl ethyl ketone or toluene to form a fluoroelastomer solution. A fabric is then coated with the fluoroelastomer solution. The solvent is evaporated and the impregnated fabric is sandwiched between unreinforced sheets to form a reinforced tooling material. The reinforced tooling material is laid up with alternating layers of unreinforced fluoroelastomer and then cured to form a composite tool which is stable through multiple thermal cycles. In addition, an elastomer tool can be provided with detail cavities shaped to accept separately formed detail structures, with each cavity including extra reinforcement in order to locate the details to close tolerances without extensive hand positioning or use of adhesives. The tool is useful in molding composites and is reusable. The life of the tool is further prolonged by a described method of repairing damaged portions of the tool.

3 Claims, 5 Drawing Sheets

METHOD FOR FORMING COMPLEX COMPOSITE ARTICLES

This invention was made with Government support under a contract awarded by the Department of the Army. The Government has certain rights in this invention.

This application is a division of application Ser. No. 07/576,176, filed Aug. 30, 1990, now U.S. Pat. No. 5,071,338, which is a continuation of application Ser. No. 07/128,134, filed Dec. 3, 1987, now abandoned, which is a continuation-in-part of copending U.S. patent application titled, "Solution Coating for a B-Staged Polyaramid Fiber Reinforced Fluoroelastomer Tooling Material", Ser. No. 093,937, filed on Sep. 8, 1987, now abandoned.

TECHNICAL FIELD

This invention relates to molding of composites, and more particularly, to the tooling and methods for forming integral composite articles requiring co-curing with separately formed detail structures.

BACKGROUND ART

There are various methods of molding composites. One method involves matched metal molds in which two halves of a mold are pressed together and heated (cured) to form an article. Although this can be a very accurate method, the cost of manufacturing the matched metal molds is very high, making the process uneconomical for small production runs. In addition, slight inaccuracies in the layup can cause large variations in the properties of the cured composite. Another method which has had widespread use is vacuum bag molding. A thin film, typically nylon, is placed over the article to be molded, forming a bag type enclosure, and a vacuum is drawn on the bag prior to heating the assembly to cure the composite material. For high quality material, the assembly is placed in an autoclave and external pressure is applied during the cure. While the vacuum bag molding method is lower in cost and more tolerant to material variations or layup inaccuracies than the matched metal molding method, the bags tend to wrinkle and cause the molded article to have an uneven surface. Also, the vacuum bag can catch on high points in the layup and bridge, or fail to contact the entire surface. Bridging results in either improper compaction or stretching of the bag beyond its yield point with resultant failure of the bag. In either case, the properties of the cured material are degraded. Finally, there is a great deal of labor involved in placing the bags over the composite articles and sealing them, and the bags can only be used once.

Another type of vacuum bag is made from silicone rubber, either reinforced, or unreinforced. This bag is designed to be reusable, however, the silicone materials tend to interact with the curing agents used in the composites and they become brittle. This results in relatively short lifetimes.

Accordingly, there has been an ongoing search in the art for a reusable tooling material which is flexible enough to conform to the part surface and provide uniform cure pressure, and yet sturdy enough to withstand the rigors of material handling and chemical interaction with the curing resin.

In forming integral complex composite structures, which require co-curing of previously produced detailed structures such as structural supports or struts, problems occur in locating the details on the composite sheets and in preventing movement during compaction and curing. Generally, a composite material, usually a preimpregnated fiber fabric or tape in sheet form, is layed-up in a female mold and the details positioned on the sheet material by hand. The details may require physical structures, such as blocks and bridges, adhesives or other means to hold the details in place. A flexible bag is then carefully laid over the mold and drawn down with vacuum to compact and hold the plies for molding. It is very difficult to locate the details, requiring templates and hand measurements to assure proper positioning. It is also difficult to prevent movement during the addition of the bag and handling of the mold, resulting in generally unacceptable part-to-part reproducibility. Consequently, details are usually attached to the article after molding using skin penetrating fasteners. Therefore, the search continues for a method for molding highly complex integral parts with precisely located detail structures.

DISCLOSURE OF THE INVENTION

This invention is directed to a method of making a flexible composite tool particularly adapted for composite molding and the resulting tool wherein the tool is reusable. The method comprises dissolving B-staged fluoroelastomer in a suitable solvent to form a fluoroelastomer solution. A fabric is then coated with the fluoroelastomer solution. The solvent is evaporated and the coated fabric is calendered or rolled between two unreinforced sheets to form a reinforced tooling material. The reinforced tooling material is laid up over a model of the desired shape and cured to form a composite tool which is stable through a plurality of thermal and chemical cycles.

Another aspect of this invention relates to molding composites using the described reusable tool. Prepregs or fiber reinforced polymer sheets are laid up on the reusable tool. Pressure and heat are applied to cure the prepreg or sheets and form the composite. The composite is removed and the tool is ready to use again. It is estimated that the tool will last through at least 50 to 100 cycles (instead of the 1 cycle for conventional vacuum bags) and if the tool becomes damaged, a method of repairing the damaged portion is described to further prolong the life of the tool.

Another aspect of this invention relates to producing a semi-rigid tool for forming a complex composite article, accurately locating separately formed detail structures on the article for co-curing therewith. The semi-rigid tool comprises an elastomer layer formed to a shape essentially matching the shape of the article, thereby forming a cavity about each detail structure. The tool further includes at least one additional layer of a reinforced elastomer placed about each cavity, the additional reinforcement increasing the rigidity of the elastomer layer about the detail cavity, preventing moving or shifting of the detail during processing. The cavities which are formed to match the separately formed details provide pockets shaped to accept placement of the detail in the tool prior to molding. This assures proper alignment of the details without physical structures or exhaustive hand layup.

In yet another aspect of the present invention, a method is disclosed for molding a complex composite article which requires accurately incorporating separately formed structures in the composite article. The method comprises providing a tool which includes a semi-rigid tool half comprised of an elastomer layer formed to a shape essentially matching the shape of the article, thereby forming a cavity about each detail structure. The tool half further includes at least one additional layer of a reinforced elastomer placed about each cavity, with the additional reinforcement increasing the rigidity of the elastomer about the structure, preventing moving or shifting of the structure during processing. The complete tool also includes a rigid tool half shaped to mate with the semi-rigid half. The next steps involve laying up a composite material on the rigid tool half, inserting the separately formed structures in the cavities of the semi-rigid tool, mating the two tool halves, and, processing to form the final article.

In a preferred embodiment of the present invention, the semi-rigid tool comprises a fluoroelastomer sheet impregnated polyamide fabric sandwiched between unreinforced fluoroelastomer sheets, with the sheets layed-up in a shape to match a finished article and then cured. The tool further includes at least one layer of reinforced fluoroelastomer placed about each detail cavity for preventing shifting of the details during molding.

Other features and advantages of the present invention will become apparent in light of the following description thereof.

BEST MODE FOR CARRYING OUT THE INVENTION

Figure 1:
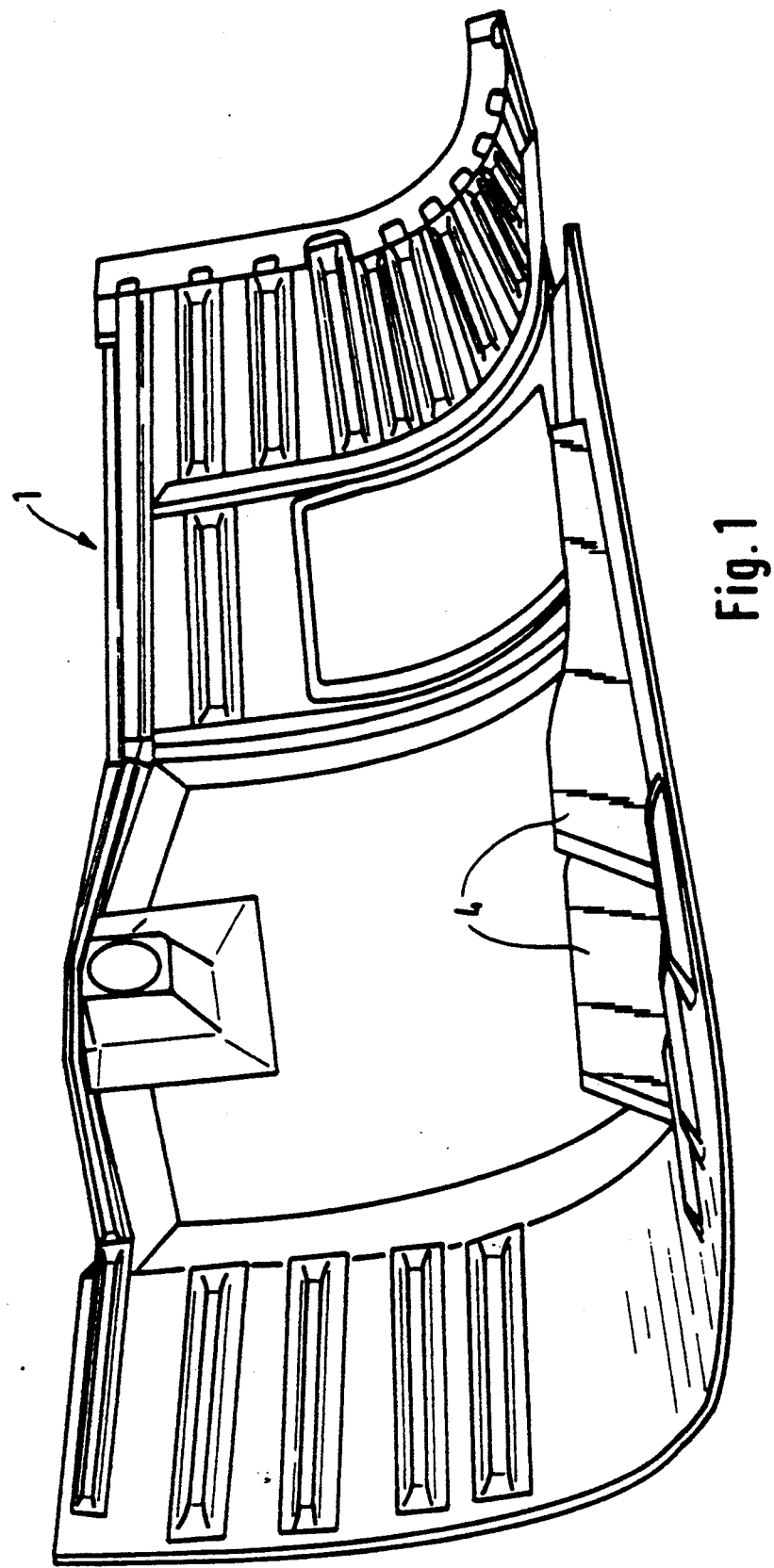
FIG. 1 is an illustration of a finished article including integrally molded struts and supports.

The fluoroelastomer solution comprises a B-staged fluoroelastomer and a suitable solvent. "B-staged fluoroelastomer" means a fluoroelastomer which has been partially cured, may be chain extended, but is not crosslinked. A B-staged fluoroelastomer is flowable and stretchable, but is not tacky.

The fluoroelastomer is made of fluoroelastomer resin, chain extenders, reactive and/or nonreactive fillers, and curing agents which will react when the compound's temperature is raised. Fluoroelastomers are preferred because of their inertness and high use temperatures. Inertness is preferred in the molding process to reduce the reaction between the resin that is being molded and the tooling material. Fluoroelastomers are also preferred because they tend to have higher use temperatures than their bromine or chlorine analogues. Most preferred are fluoroelastomers which produce a rubber with a hardness of about 70 durometers to about 80 durometers because of its intended application as a flexible tool. It is believed that any halogenated elastomers, fluorosilicone elastomers or fluorophosphazene elastomers could be used in the practice of this invention. Exemplary materials are Fluorel fluoroelastomer supplied by 3M Company, St. Paul, Minn.; and Viton fluoroelastomer manufactured by E. I. DuPont DeNemours Corporation, Wilmington, Del.

A suitable solvent must be chosen. The solvent must dissolve the fluoroelastomer completely, which means that there is no fluoroelastomer precipitate and that higher weight polymers are not left undissolved. Methyl ethyl ketone (2-butanone) and toluene (methylbenzene) are preferred solvents, but typically any alkyl aromatic solvent can also be used. Typically about 80% by volume to about 99% by volume of solvent is used. Preferably, the fluoroelastomer solution comprises about 90% to about 95% by volume solvent. If too little solvent is used, then the solution is too viscous and will not properly impregnate the fibers, while if too much solvent is used, then very little fluoroelastomer is impregnated into the fibers and more impregnation cycles are required. The solvent serves two functions. It dissolves the fluoroelastomer allowing impregnation and also washes any residues of the cleaning process from the fiber. Without the final cleansing action of the solvent, the fluoroelastomer may not stick to the fiber.

Typically, the fluoroelastomer compound used comprises the fluoroelastomer resin and several additives which may include agents (such as dicyanamide or bisphenol A), fillers (such as carbon black), or scavengers (such as magnesium oxide or calcium oxide).

Polyaramid fiber such as Kevlar fiber, commercially available from E. I. DuPont DeNemours, Wilmington, Del., and other companies, is the preferred fiber to use in the invention. However, other fibers could be used also, such as graphite or glass fibers. Polyaramid fibers are preferred because of their high tear strength properties. Polyaramid fibers are also a good choice because of their high tensile properties including both strength and modulus.

Typically, the fluoroelastomer solution is coated onto a fabric, which is a plurality of interwoven bundles of fibers. Typically, for this application, each bundle comprises 6000 fibers. Typical fabrics, used for this application, have between 10 and 15 bundles per inch in the warp and fill directions. An exemplary fabric is Clarkschwebel Textile Company's, style 354, which is a symmetrical basket weave material with 13 bundles per inch in both directions. Various styles of fabric and deniers of yarn can be used. The fabric normally has approximately the same strength in both the warp and the fill directions (parallel to the orthogonal fiber axes), although other weaves can be used. Elongation of the material is very low in the warp and fill directions, but high in the bias directions.

In this process chosen fabric is impregnated with the fluoroelastomer solution. In the impregnation process, the fluoroelastomer solution may be applied to the fabric in a variety of ways. For example, the fluoroelastomer solution could be brushed onto the fabric with an instrument similar to a paint brush, or a series of rollers could be used to roll the fabric through a trough to coat the fluoroelastomer solution onto the fabric. Other methods which could be used to impregnate the fabric could include pressure impregnation, where a series of nozzles would be used to force the solution into and through the fabric. Another method, which would work with a more viscous solution, would be to use a doctor blade to apply a uniform thickness of the material and a series of rollers to work the material into the fabric.

It is preferred that the polyaramid fabric be completely impregnated by the fluoroelastomer solution. If not, the bare polyaramid fabric can act like a wick and pick up water. Preferably polyaramid fabrics should be kept dry. It is preferred that every fiber is totally encapsulated by fluoroelastomer. If the Kevlar fabric is not dried before the impregnation process, or the fibers are not completely coated, the accumulation of water generated by the condensation reactions occuring during curing can cause delamination of the layered structure and subsequent failure of the tool made from this material.

The solvent is evaporated using conventional methods. The solvent is either flashed off at elevated temperatures (but below that required to cure the fluoroelastomer) or evaporated at room temperature over a longer period of time. Preferably all of the solvent is evaporated before encapsulation of the impregnated fabric between the layers of unreinforced fluoroelastomer takes place or the trapped solvent may vaporize during the cure process and cause failure of the material.

After the fabric has been impregnated with the fluoroelastomer and encapsulated with fluoroelastomer, the material can be fabricated into a tool. First, reinforced tooling material is fabricated by sandwiching the impregnated material between thin cover sheets of unreinforced material. Typical methods of sandwiching these layers would be calendering (rolling) or pressing. No adhesive is needed which is especially beneficial because adhesive is subject to thermal degradation and could subtract from the life of the tooling material or subsequent tool. Second, alternating layers of the reinforced and unreinforced materials are laid up over a model of the shape that is desired. Finally, the layup is cured to form a tool (such as a semirigid locator caul). The curing process takes place in two phases, cure and post cure. The cure phase is typically at about 300°-400° F. for about 3-5 hours at about 100-200 psi pressure. The post-curing phase is typically at about 400°-500° F. for about 8-10 hours at atmospheric pressure with no restraint. During the cure and post cure, hydrogen fluoride and water are evolved. Although these are in low concentrations, it is preferred that acidic residue on metal tooling after the cure cycle is removed.

Semi-Rigid Tooling

In forming a semi-rigid tool for providing articles requiring precise location of separately formed details, a model is first constructed to match the shape of the desired finished article. For example, referring to FIG. 1, a composite helicopter fuselage section 1 is shown which requires a smooth external skin and internally located struts and supports. It is desirable to produce an integral structure using separately manufactured details to limit complexity in forming the final finished article. In addition, this allows integral molding of stiffeners and bulkhead attachment points, avoiding the use of fasteners which require skin penetration.

A model of the fuselage section may be made of any suitable material and coated with a mold release agent. The elastomer tooling material is then layed over the model with various strips cut and bonded around each detail. In a typical tool, about two layers of reinforced and two layers of unreinforced material may be alternatly used to form the main sheet, covering all detail and nondetail areas. For illustrative purposes, the fluoroelastomer material previously disclosed will be discussed in detail. However, it will be understood by those skilled in the art that any elastomer material may be used. For example, silicone, neoprene or nitrile rubbers may be acceptable substitutes. In terms of reinforcement, glass, kevlar or graphite fiber may be used. In chosing a suitable material, consideration must be given to providing stiffness and rigidity in detail areas while allowing flexibility and stretch to provide uniform compaction of the laminate plies. Of course, compatibility with the composite system and temperature limitations should be considered. For illustrative purposes, the semi-rigid tool half is comprised of a reinforced fluoroelastomer impregnated polyamide fabric sandwiched between unreinforced fluoroelastomer sheets. Each sheet of unreinforced material may be about 0.030 inches thick and each reinforced sheet about 0.040 inches thick, with the reinforced sheet including kevlar fibers at a ±45° orientation to the long axis of the tool. Of course, the material thickness and fiber orientation will be determined by the user.

After the layers are added to the model, a temporary vacuum bag is added and vacuum applied. The elastomer plies are then drawn down to ensure precise forming around the detail structures while consolidating the layup. After the initial sheets are added, additional reinforcing material is included about the detail structures to add rigidity in those areas. This prevents the collapse or distortion of the detail cavities. For example, four more layers of material may be layed about each detail, two reinforced and two unreinforced, with each layer tapered to provide a gradual buildup of material.

Figure 2:
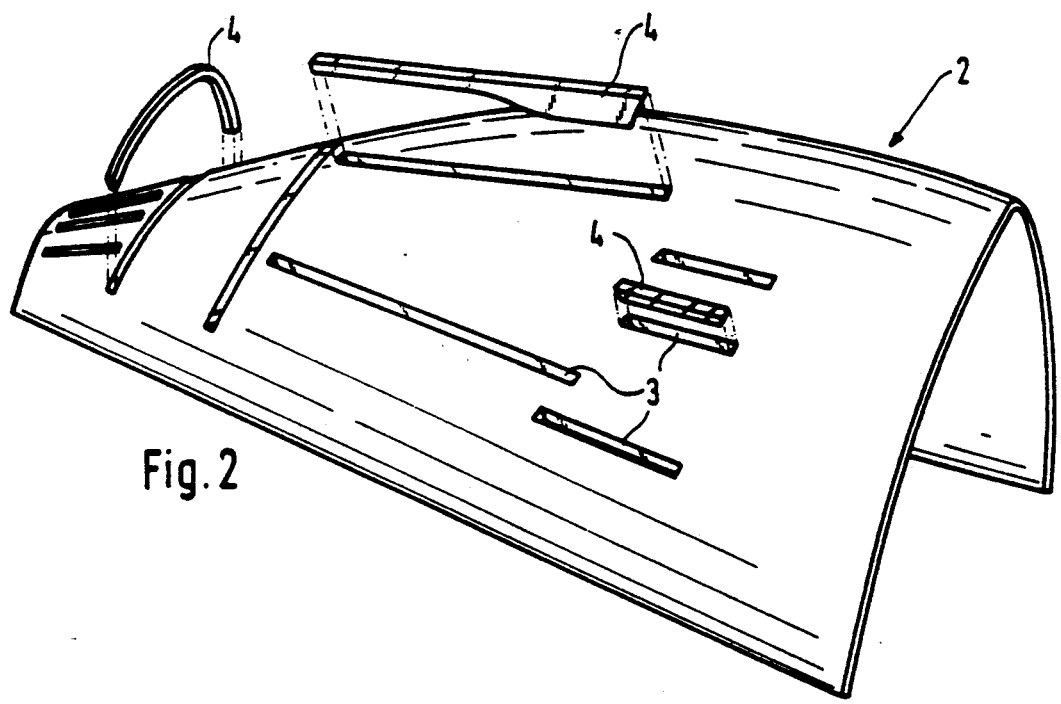
FIG. 2 is an illustrative view of a typical semi-rigid elastomer tool including cavities for receiving detail structures.
Figure 3:
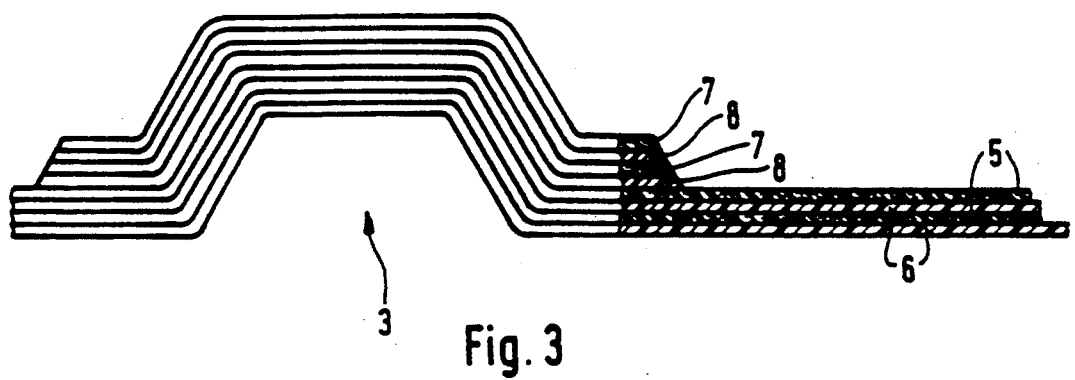
FIG. 3 is an enlarged sectional view of a typical detail cavity including additional reinforcement.

Referring to FIG. 2, a semi-rigid elastomer tool 2 shaped to compliment the fuselage section 1 is shown, including cavities 3 for receiving detail structures 4. Referring to FIG. 3, the eight ply reinforced structure incorporated about a typical detail is shown. Four base plies including two reinforced 5 and two unreinforced 6 are overlaid with four additional plies in the detail area, two reinforced 7 and two unreinforced 8. It should be noted that excessive rigidity is to be avoided as an overly rigid area will become self-supporting and proper compaction and consolidation of the composite will not be achieved. By increasing the rigidity of the material about the details, without eliminating the elasticity of the elastomer, precise incorporation and location of the details in the final structure is achieved.

It may be desirable to incorporate a plurality of pulling blocks about the fluoroelastomer tool for actuating disengagement from a formed article. Positioning blocks may be located between the elastomer layers, and may comprise drilled and tapped aluminum blocks, anodized and primed to give a bondable surface. After complete lay-up, the sheets are compacted by vacuum and cured as previously described. In addition, it has been found beneficial to age the fluoroelastomer by temperature cycling after coating with a mold release agent. Such aging prevents sticking of the tool to the part. The finished semi-rigid tool includes a plurality of cavities or pockets shaped to match the separately formed details which will be co-cured to the composite skin material during final production. Utilizing cavities in the semi-rigid tool assures precise location of the details without additional measuring or templates.

Figure 4:
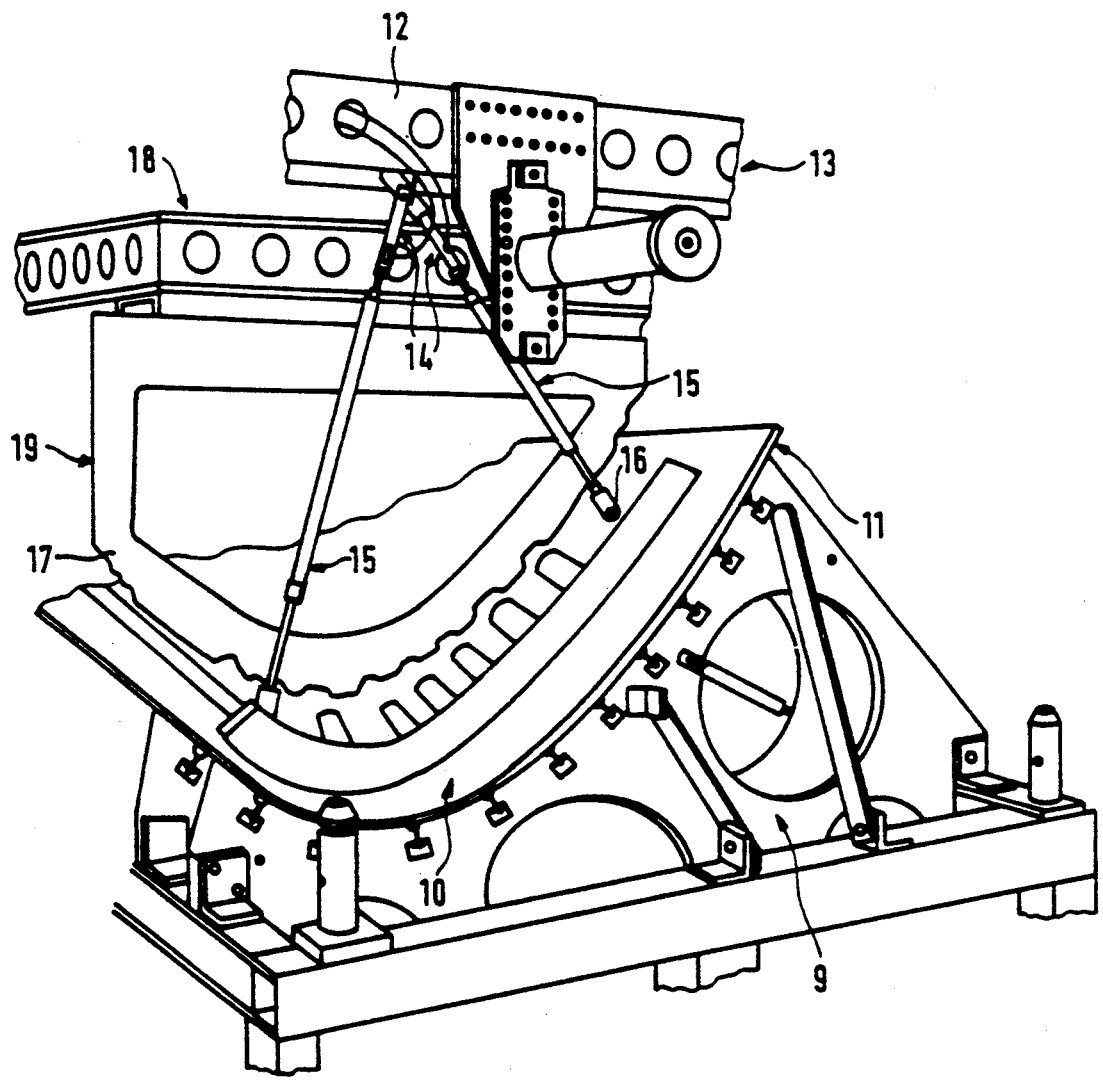
FIG. 4 is a front view of a complete mated tool.
Figure 5:
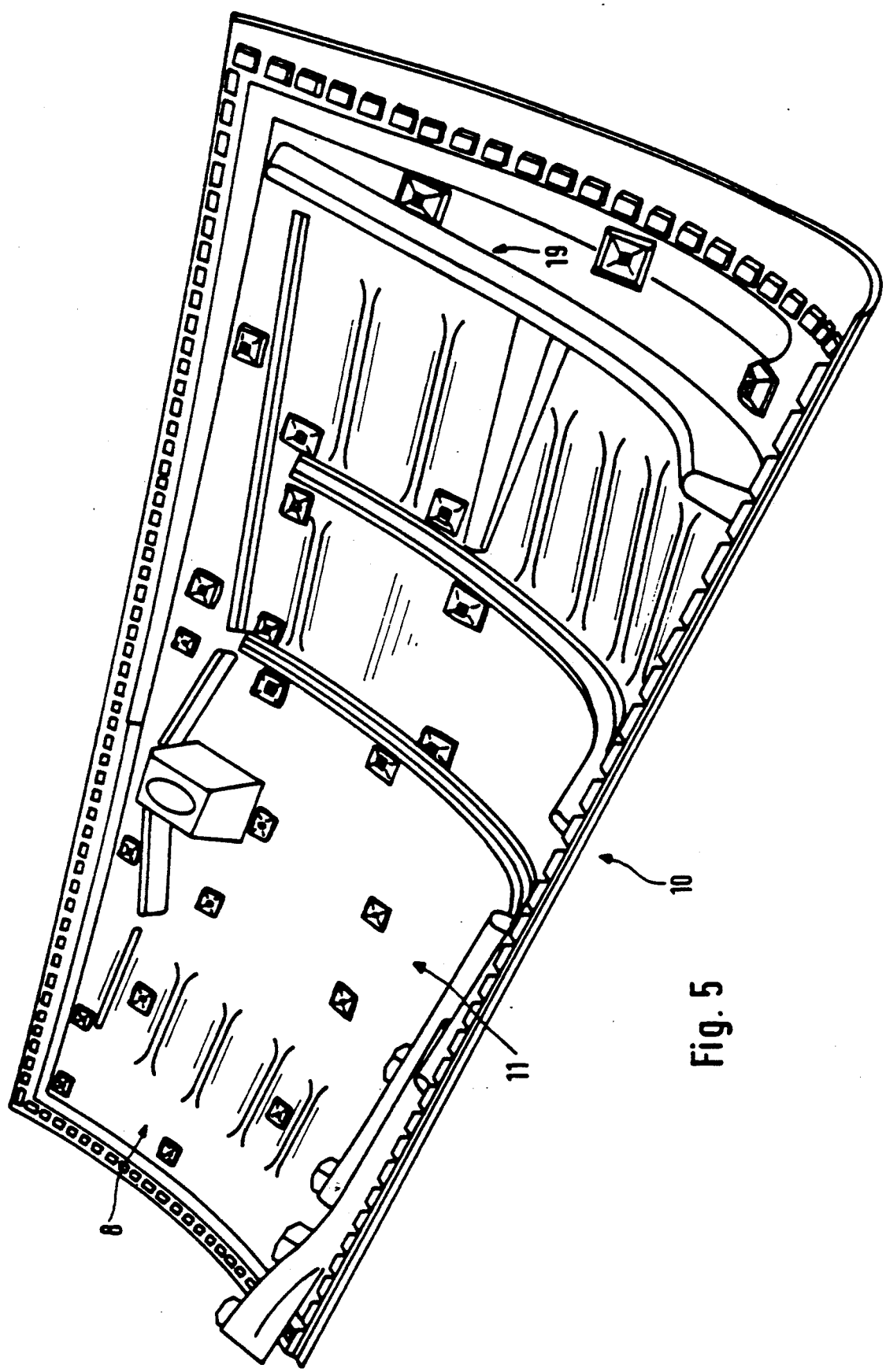
FIG. 5 is a side view of a mated tool with the strongback removed.
Figure 6:
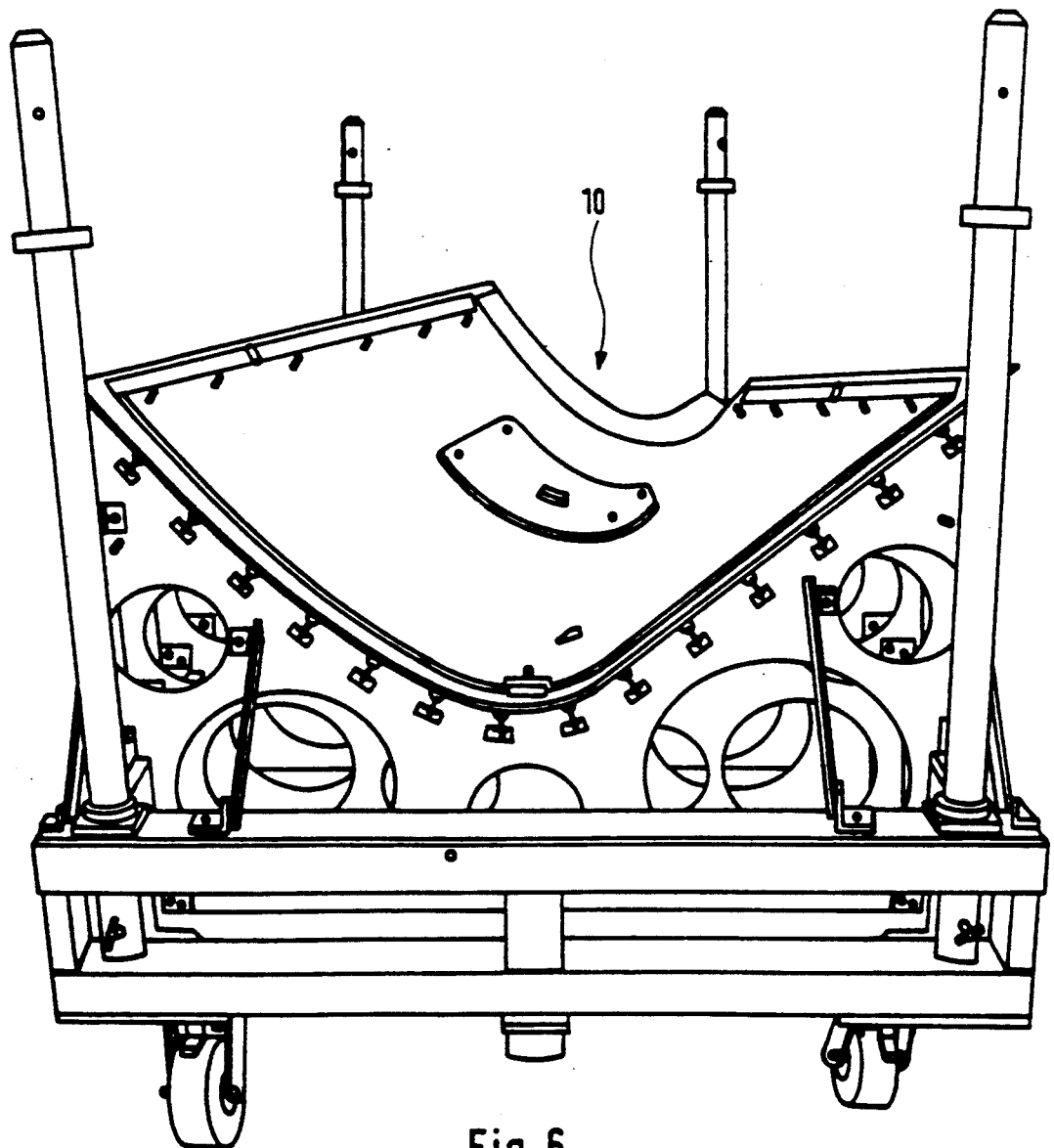
FIG. 6 is a front view of a rigid tool half.

The finished fluoroelastomer tool is then attached to a strongback which provides a framework for supporting the flexible tool during layup and mating with a matching tool half, assuring precise alignment between the tool halves. Referring to FIG. 4, a complete tool 9 is shown in the mated condition, including a rigid tool half 10 and a semi-rigid tool half 11 supported by a strongback 12. For illustrative purposes, FIG. 5 shows the semi-rigid tool half 11 mated to the rigid tool half without a strongback, with FIG. 6 illustrating the rigid tool half.

The strongback 12 may be rotatable, allowing the semi-rigid tool to be supported in a position where all the details are easily loaded into their respective cavities, and then rotated for mating with the rigid tool half. The strongback 12 may be composed of steel aluminum or another suitable material. Referring to FIG. 4, the semi-rigid tool half 11 is supported by the strong back 12 which includes a main frame 13 for attachment of a plurality of release actuators 14 for controllably lifting the elastomer tool after molding. Each actuator includes an extendible cylinder 15 which attaches to an eye bolt 16 which is threaded into a positioning block 17 embedded in the elastomer, holding the elastomer to the strongback. The strongback also includes a subframe 18 which contains a contour grid 19 for supporting the elastomer in its approximate molding shape while it is in the detail loading position. FIG. 2 generally shows the semi-rigid tool in a position for receiving details.

Prior to mating the tool halves, a mold release agent, such as Miller Stevenson MS-142 is applied to the semi-rigid tool half and baked for about 2 hours at about 350° F., with the procedure repeated several times to age the tool. A composite material is then placed on the rigid tool half and the details inserted into the detail cavities in the semi-rigid tool half. The composite material may comprise one or more layers of a resin impregnated woven fiber sheet, commonly referred to as a "prepreg". The details may be preplied and preformed composite shapes including honeycomb core sections. Once loaded, the semi-rigid tool is rotated, aligned and mated with the rigid tool, as shown in FIG. 4. It is interesting to note that no adhesives or other material are required to hold the details in position during alignment and positioning of the semi-rigid tool. It appears that the flexibility of the elastomer material binds the detail structures, thereby holding the details while the tool is placed in position. The composite is then vacuum compacted, heated and cured, such as in an autoclave, with the elastomer tooling assuring even resin impregnation about the composite and precise location of details.

After curing is complete, the semi-rigid tool is peeled off the complete article using the retractable actuators following a programed sequence in which each actuator is operated in sequence, to prevent damaging the details during removal. The sequence is a function of detail shape and each article will require some experimentation to determine the proper sequence for removal. It should be noted that, where possible, the draft angles of the detail structures should be adjusted to provide ease of tool removal. For example, using sloped rather than straight sides eases tool removal.

EXAMPLE 50 grams of B-staged fluoroelastomer was dissolved in 9 ounces of 2-butanone. The solution was coated onto both sides of a 6 inch by 6 inch Kevlar sheet with a brush. The fabric was allowed to air dry for 30 minutes at room temperature to evaporate the solvent. Another coating of dissolved B-staged fluoroelastomer was brushed onto each side by dissolving 100 grams of B-staged fluoroelastomer in 9 ounces of 2-butanone and applying the solution to the fabric. The fabric was again allowed to air dry for 30 minutes at room temperature to evaporate the solvent. This material was then sandwiched between two unreinforced B-staged fluoroelastomer sheets to form a test coupon.

For a full scale test, fifty yards of Kevlar polyaramid fabric was impregnated (with the above B-staged fluoroelastomer solutions) and evaporated using a series of rollers and troughs in 47 minutes in a conventional oven at about 175°-180° F. This process was repeated three times to ensure better impregnation. After evaporation the impregnated fabric was sandwiched between unreinforced B-staged fluoroelastomer sheets by calendering the sheets onto the fabric. No adhesive was needed. The reinforced tooling material and unreinforced fluoroelastomer were alternately laid up over a model of the desired shape and cured at 350° F. for 4 hours at 100 psi and then post cured at 450° F. for 8 hours at atmospheric pressure with no restraint in a conventional oven.

The resulting solution coated fluoroelastomer impregnated fabric tool can be used to mold composites. Typically, at least one layer of a fabric which has been preimpregnated with a polymer material (prepreg) is laid up on the tool. Heat and pressure are conventionally applied to cure the preimpregnated fabric to form a composite. Other conventionally known methods for molding composites using this tool will be apparent to those skilled in the art.

The solution coated fluoroelastomer impregnated fabric tool is an improvement over the adhesive coated fabric used previously. With the adhesive coated material, the adhesive was not compatible with the polyaramid fabric reinforcement and the tools failed prematurely. The fluoroelastomer impregnated fabric tool approach to manufacturing composite parts has several advantages over currently used vacuum bags. The tool is stable throughout a plurality of thermal cycles and therefore is reusable. Testing has demonstrated that at least 50 parts can be produced from one tool, while conventional vacuum bags produce only one part and are usable only once. It is estimated that at least 100 parts will be obtainable from a tool before it must be replaced. Another advantage is that the tooling material is not seriously attacked by the amine curing agents found in conventional epoxy resins and the mechanical properties of the fluoroelastomer material do not degrade with time. Minor damage to the surface of the tool can also be repaired by coating the damaged portion with a fluoroelastomer solution similar to that used to impregnate the fabric. This gives increased tooling life. In addition, the tool accurately locates the internal details of a composite part and gives improved surface definition to those surfaces of the part in contact with the tool. This leads to superior quality parts. The increased reinforcement of the detail cavities pro ides precise compaction while ensuring that details are located to close tolerances. In addition, production time is substantially reduced as details are put in the detail cavities rather than layed up on the composite material, assuring good part-to-part reproducibility. It has been found that such details can be located to a tolerance of 0.004 inches using the semi-rigid fluoroelastomer tooling material of the present invention. In addition, since no structures, peel plies or adhesives are needed, both labor and material requirements are reduced and part throughput is increased.

It should be understood that the invention is not limited to any particular embodiment shown and described herein, but that various changes and modifications may be made without departing from the spirit or scope of this concept as defined by the following claims.

We claim:

1. A method for molding a complex composite article and accurately locating a separately formed detailed structure on the article for co-curing therewith, the method comprising:

providing a semi-rigid tool half having an elastomer layer having sufficient flexibility and stretch to provide uniform compaction of a plurality of laminate plys, the tool half formed to a shape essentially matching the shape of the article, the elastomer layer having one or more cavities shaped to accept a detail structure therein, and means for preventing movement or shifting of a detail structure located in the cavity during processing, said means including at least one additional layer of a reinforced elastomer disposed over the portion of the elastomer layer forming the cavity, the additional reinforcement provided by the reinforced elastomer layer increasing the rigidity of the elastomer layer about the detail cavity, without eliminating the elasticity of the elastomer layer, providing a rigid tool half shaped to mate with the semi-rigid tool half;

placing the plurality of laminate plys on the rigid tool half;

inserting detail structures into the one or more cavities in the elastomer layer;

mating the two tool halves; and, processing to form a composite article having accurately located integral detail structures.

2. The method of claim 1 wherein the elastomer layer comprises a fluoroelastomer impregnated polyaramid fabric.

3. The method of claim 1 wherein the elastomer layer is a series of plies, comprising an impregnated polyaramid fabric ply sandwiched between un-reinforced fluoroelastomer plies.

* * * * *